United States Patent
DeLuca et al.

(10) Patent No.: US 9,952,935 B2
(45) Date of Patent: Apr. 24, 2018

(54) EXCLUDING CONTENT ITEMS FROM A BACKUP OPERATION

(71) Applicant: International Business Machines Corporation, Armonk, NY (US)

(72) Inventors: Lisa Seacat DeLuca, Baltimore, MD (US); Dana L. Price, Surf City, NC (US); Aaron J. Quirk, Cary, NC (US); Shelbee D. Smith-Eigenbrode, Thornton, CO (US)

(73) Assignee: International Business Machines Corporation, Armonk, NY (US)

( * ) Notice: Subject to any disclaimer, the term of this patent is extended or adjusted under 35 U.S.C. 154(b) by 288 days.

(21) Appl. No.: 14/988,947

(22) Filed: Jan. 6, 2016

(65) Prior Publication Data

US 2017/0192852 A1 Jul. 6, 2017

(51) Int. Cl.
*G06F 17/00* (2006.01)
*G06F 11/14* (2006.01)
(Continued)

(52) U.S. Cl.
CPC ...... *G06F 11/1451* (2013.01); *G06F 11/1464* (2013.01); *G06F 17/30091* (2013.01); *H04L 67/06* (2013.01); *G06F 2201/84* (2013.01)

(58) Field of Classification Search
CPC ............. G06F 11/1451; G06F 11/1464; G06F 17/30091; G06F 2201/84; H04L 67/06
(Continued)

(56) References Cited

U.S. PATENT DOCUMENTS 6,157,931 A * 12/2000 Cane .................. G06F 11/1451
8,554,736 B2 10/2013 Radon et al.
(Continued)

FOREIGN PATENT DOCUMENTS

GB    2507094 A      4/2014
WO    9835285 A3     8/1998
WO    2010030288 A1  3/2010

OTHER PUBLICATIONS

Kaczmarski, Michael, et al., "Beyond backup toward storage management", IBM Systems Journal, vol. 42, No. 2, © 2003, pp. 322-337.*
(Continued)

*Primary Examiner* — Robert Stevens
(74) *Attorney, Agent, or Firm* — William H. Hartwell; Hunter E. Webb; Keohane & D'Alessandro, PLLC

(57) ABSTRACT

Approaches presented herein enable automatically detecting and preventing backup of content from a client system to a remote backup system based on specified criteria. Specifically, content on a client system is analyzed to determine one or more of content items to be backed up from the client system to a remote backup system. A set of content items from among the content items that match one or more specified criteria is detected. The specified criteria may include classes of content (e.g., document, text message, e-mail message, photograph, etc.) and contact names associated with the classes of content (e.g., creator, recipient, sender, owner, etc.). Responsive to detecting the set of content items that match the one or more specified criteria, the set of content items is prevented from being backed up to the remote backup system.

20 Claims, 5 Drawing Sheets

(51) Int. Cl.
*G06F 17/30* (2006.01)
*H04L 29/08* (2006.01)

(58) Field of Classification Search
USPC .......................................................... 707/647
See application file for complete search history.

(56) References Cited

U.S. PATENT DOCUMENTS

| | | | |
|---|---|---|---|
| 8,639,897 B1* | 1/2014 | Brocco | G06F 11/1469 711/162 |
| 9,659,077 B2* | 5/2017 | Chen | G06F 17/30581 |
| 2002/0049778 A1 | 4/2002 | Bell et al. | |
| 2007/0022145 A1 | 1/2007 | Kavuri | |
| 2007/0038681 A1* | 2/2007 | Pierce | G06F 11/1464 |
| 2007/0179926 A1 | 8/2007 | Chiang | |
| 2008/0046483 A1* | 2/2008 | Lehr | G06F 11/1451 |
| 2008/0104145 A1* | 5/2008 | Lipman | G06F 11/1456 |
| 2009/0164529 A1* | 6/2009 | McCain | G06F 11/1464 |
| 2010/0280994 A1 | 11/2010 | Radon et al. | |
| 2011/0161296 A1* | 6/2011 | Kaczmarski | G06F 11/1458 707/640 |
| 2013/0103645 A1 | 4/2013 | Lao et al. | |
| 2013/0339302 A1* | 12/2013 | Zhang | G06F 17/30581 707/649 |
| 2014/0089279 A1* | 3/2014 | Gibson | G06F 17/30082 707/694 |
| 2014/0201140 A1* | 7/2014 | Vibhor | H04L 29/0854 707/622 |
| 2014/0297593 A1 | 10/2014 | Baumann et al. | |
| 2015/0032785 A1 | 1/2015 | Itasaki et al. | |
| 2015/0212896 A1 | 7/2015 | Pawar et al. | |

OTHER PUBLICATIONS

Jayaram et al., "An Empirical Analysis of Similarity in Virtual Machine Images", Middleware 2011 Industry Track, Dec. 12, 2011, 6 pages.
Sampaio et al., "Open Source Backup Systems for SMEs", New Contributions in Information Systems and Technologies, 2015, pp. 823-832.

\* cited by examiner

EXCLUDING CONTENT ITEMS FROM A BACKUP OPERATION

TECHNICAL FIELD

This invention relates generally to data backup and, more specifically, to automatically detecting and preventing backup of content from a client system to a remote backup system based on specified criteria.

BACKGROUND

Backup is the activity of copying files or databases so that they will be preserved in case of equipment failure or loss. Backup is usually a routine part of the operation of large businesses with mainframes as well as the administrators of smaller business computers. For individual users, backup of personal computers and electronic devices having personal data is also necessary but often neglected. Backing up files or data can be very time consuming due to the increasing amounts of data that are to be backed up, and the increasing size of storage devices. Also, content storage prices typically increase as the amount of storage space provided increases providing an incentive to many customers to decrease the amount of content that is backed up.

SUMMARY

In general, embodiments described herein provide approaches for automatically detecting and preventing backup of content from a client system to a remote backup system based on specified criteria. Specifically, content on a client system is analyzed to determine one or more of content items to be backed up from the client system to a remote backup system. A set of content items from among the content items that match one or more specified criteria is detected. The specified criteria may include classes of content (e.g., document, text message, e-mail message, photograph, etc.) and contact names associated with the classes of content (e.g., creator, recipient, sender, owner, etc.). Responsive to detecting the set of content items that match the one or more specified criteria, the set of content items is prevented from being backed up to the remote backup system.

One aspect of the present invention includes a computer-implemented method for automatically detecting and preventing backup of content items from a client system to a remote backup system, comprising: analyzing content on the client system to determine one or more content items to be backed up from the client system to the remote backup system; detecting a set of content items among the one or more content items that match one or more specified criteria, wherein the one or more specified criteria include at least one of: classes of content, one or more contact names associated with the classes of content, a quality of a content item, a subject of a content item, or a location of a content item; responsive to detecting the set of content items that match the one or more specified criteria, preventing the set of content items from being backed up to the remote backup system; and transferring any remaining content items to be backed up to the remote backup system for storage.

Another aspect of the present invention includes a computer system for automatically detecting and preventing backup of content items from a client system to a remote backup system, the computer system comprising: a memory medium comprising program instructions; a bus coupled to the memory medium; and a processor for executing the program instructions, the instructions causing the system to: analyze content on the client system to determine one or more content items to be backed up from the client system to the remote backup system; detect a set of content items among the one or more content items that match one or more specified criteria, wherein the one or more specified criteria include at least one of: classes of content, one or more contact names associated with the classes of content, a quality of a content item, a subject of a content item, or a location of a content item; responsive to detecting the set of content items that match the one or more specified criteria, prevent the set of content items from being backed up to the remote backup system; and transfer any remaining content items to be backed up to the remote backup system for storage.

Yet another aspect of the present invention includes a computer program product for automatically detecting and preventing backup of content items from a client system to a remote backup system, the computer program product comprising a computer readable storage device, and program instructions stored on the computer readable storage device, to: analyze content on the client system to determine one or more content items to be backed up from the client system to the remote backup system; detect a set of content items among the one or more content items that match one or more specified criteria, wherein the one or more specified criteria include at least one of: classes of content, one or more contact names associated with the classes of content, a quality of a content item, a subject of a content item, or a location of a content item; responsive to detecting the set of content items that match the one or more specified criteria, prevent the set of content items from being backed up to the remote backup system; and transfer any remaining content items to be backed up to the remote backup system for storage.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which.

Figure 1:
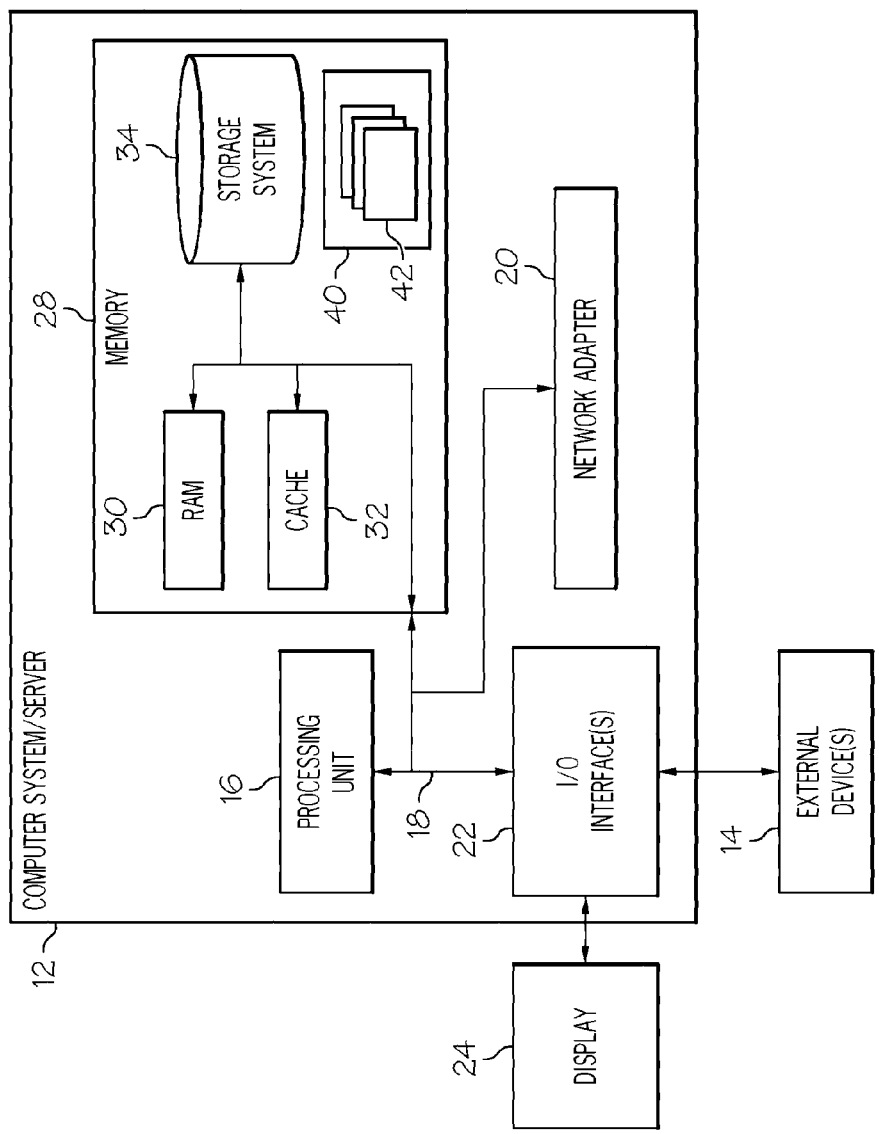
FIG. 1 shows an architecture 10 in which the invention may be implemented according to illustrative embodiments.

The drawings are not necessarily to scale. The drawings are merely representations, not intended to portray specific parameters of the invention. The drawings are intended to depict only typical embodiments of the invention, and therefore should not be considered as limiting in scope. In the drawings, like numbering represents like elements.

DETAILED DESCRIPTION

Illustrative embodiments will now be described more fully herein with reference to the accompanying drawings, in which illustrative embodiments are shown. It will be appreciated that this disclosure may be embodied in many different forms and should not be construed as limited to the illustrative embodiments set forth herein. Rather, these embodiments are provided so that this disclosure will be thorough and complete and will fully convey the scope of this disclosure to those skilled in the art.

Furthermore, the terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. Furthermore, similar elements in different figures may be assigned similar element numbers. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Unless specifically stated otherwise, it may be appreciated that terms such as "processing," "detecting," "determining," "evaluating," "receiving," or the like, refer to the action and/or processes of a computer or computing system, or similar electronic data center device, that manipulates and/or transforms data represented as physical quantities (e.g., electronic) within the computing system's registers and/or memories into other data similarly represented as physical quantities within the computing system's memories, registers or other such information storage, transmission or viewing devices. The embodiments are not limited in this context.

As stated above, embodiments described herein provide approaches for automatically detecting and preventing backup of content from a client system to a remote backup system based on specified criteria. Specifically, content on a client system is analyzed to determine one or more of content items to be backed up from the client system to a remote backup system. A set of content items from among the content items that match one or more specified criteria is detected. The specified criteria may include classes of content (e.g., document, text message, e-mail message, photograph, etc.) and contact names associated with the classes of content (e.g., creator, recipient, sender, owner, etc.). Responsive to detecting the set of content items that match the one or more specified criteria, the set of content items is prevented from being backed up to the remote backup system.

The inventors of the invention described herein have recognized certain deficiencies in known automatic backup methods. For example, current backup capabilities are often set up to backup content having a certain type or associated with a specific time frame. Embodiments of the present invention provide more granular backups of content that can distinguish between content beyond file type, age, etc. The approaches described herein provide for preventing a backup of undesired content of an electronic device which can result in reducing the extraneous backup of undesired objects which can save disk/cloud space, battery levels, bandwidth consumption, and can give the user more responsive device performance.

Referring now to FIG. 1, a computerized implementation 10 of an embodiment for automatically detecting and preventing backup of content items from a client system to a remote backup system based on specified criteria will be shown and described. Computerized implementation 10 is only one example of a suitable implementation and is not intended to suggest any limitation as to the scope of use or functionality of embodiments of the invention described herein. Regardless, computerized implementation 10 is capable of being implemented and/or performing any of the functionality set forth hereinabove.

In computerized implementation 10, there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

This is intended to demonstrate, among other things, that the present invention could be implemented within a network environment (e.g., the Internet, a wide area network (WAN), a local area network (LAN), a virtual private network (VPN), etc.), a cloud computing environment, a cellular network, or on a stand-alone computer system. Communication throughout the network can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer system 12 is intended to demonstrate that some or all of the components of implementation 10 could be deployed, managed, serviced, etc., by a service provider who offers to implement, deploy, and/or perform the functions of the present invention for others.

Computer system 12 is intended to represent any type of computer system that may be implemented in deploying/realizing the teachings recited herein. Computer system 12 may be described in the general context of computer system executable instructions, such as program modules, being executed by a computer system. Generally, program modules may include routines, programs, objects, components, logic, data structures, and so on, that perform particular tasks or implement particular abstract data types. In this particular example, computer system 12 represents an illustrative system for automatically detecting and preventing backup of content items from a client system to a remote backup system based on specified criteria. It should be understood that any other computers implemented under the present invention may have different components/software, but can perform similar functions.

Computer system 12 in computerized implementation 10 is shown in the form of a general-purpose computing device. The components of computer system 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Processing unit 16 refers, generally, to any apparatus that performs logic operations, computational tasks, control functions, etc. A processor may include one or more subsystems, components, and/or other processors. A processor will typically include various logic components that operate using a clock signal to latch data, advance logic states, synchronize computations and logic operations, and/or provide other timing functions. During operation, processing unit 16 collects and routes signals representing inputs and outputs between external devices 14 and input devices (not shown). The signals can be transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the signals may be encrypted using, for example, trusted key-pair encryption. Different systems may transmit information using different communication pathways, such as Ethernet or wireless networks, direct serial or parallel connections, USB, Firewire®, Bluetooth®, or other proprietary interfaces. (Firewire is a registered trademark of Apple Computer, Inc. Bluetooth is a registered trademark of Bluetooth Special Interest Group (SIG)).

In general, processing unit 16 executes computer program code, such as program code for automatically detecting and preventing backup of content items from a client system to a remote backup system based on specified criteria, which is stored in memory 28, storage system 34, and/or program/utility 40. While executing computer program code, processing unit 16 can read and/or write data to/from memory 28, storage system 34, and program/utility 40.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media, (e.g., VCRs, DVRs, RAID arrays, USB hard drives, optical disk recorders, flash storage devices, and/or any other data processing and storage elements for storing and/or processing data). By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation. Memory 28 may also have an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
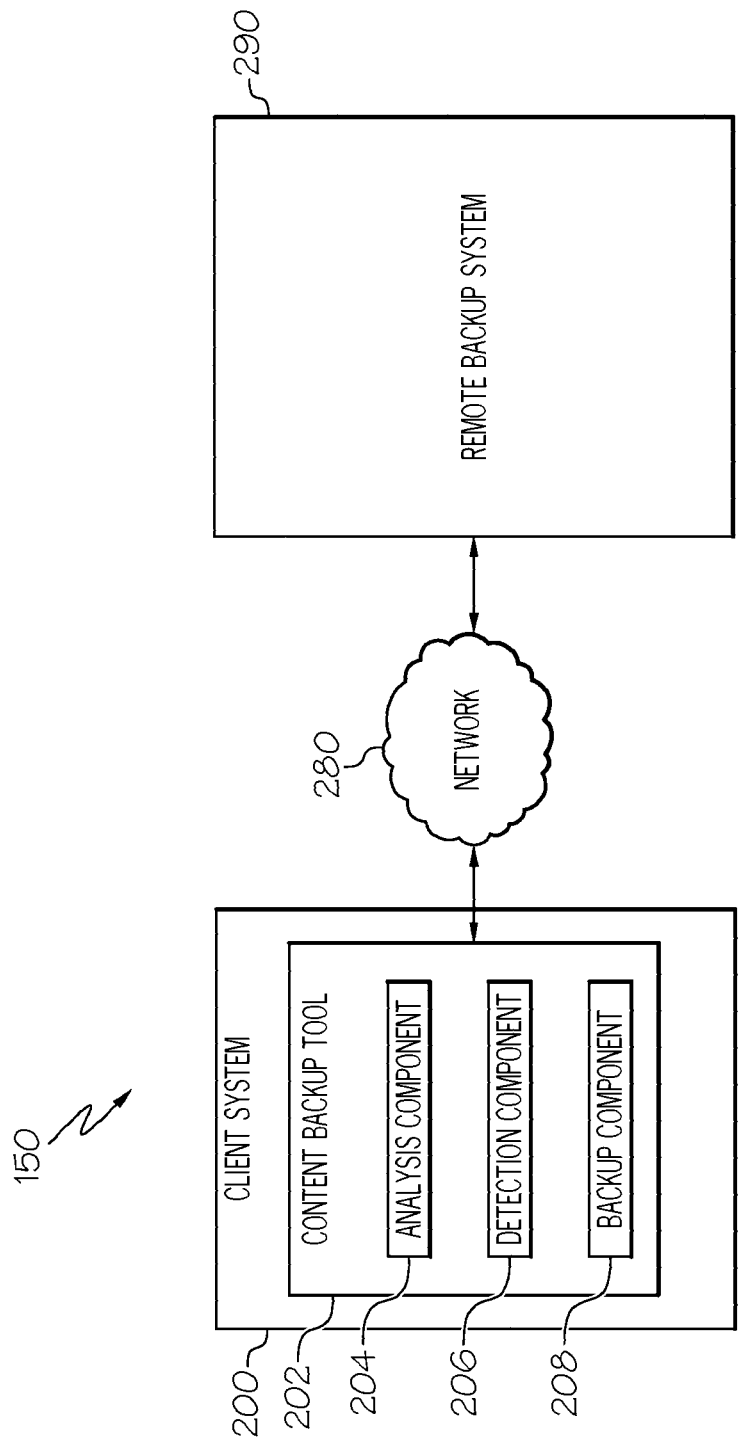
FIG. 2 shows a block diagram illustrating a smart backup system 150 according to illustrative embodiments.

Referring now to FIG. 2, smart backup system 150 for detecting and preventing backup of content items from client system 200 to remote backup system 290 via network 280 (e.g., the Internet) based on specified criteria is shown. Client system 200 (e.g., computer system 12 of FIG. 1) may include, but is not limited to, a smart phone, a personal computer (PC), a server, a personal data assistant (PDA), a tablet, or any other electronic device capable of including content which may be backed up to a remote backup system. Client system 200 may comprise one or more user interface mechanisms, such as, but not limited to, a touch interface, a mouse, a pointer, or a voice interface.

Client system 200 may also comprise a memory (e.g., memory 28 shown in FIG. 1) in which a content backup tool 202 resides, for example, as a program module 42 of program/utility 40 (FIG. 1). In some embodiments, content backup tool 202 may be located remotely, such as on a separate server. In any case, content backup tool 202 may comprise one or more components for carrying out embodiments of the present invention. As shown, content backup tool 202 includes analysis component 204, detection component 206, and backup component 208. The function and operation of content backup tool 200 as its components will be described in detail below.

Analysis component 204 can analyze content on client system 200 to determine one or more of content items to be backed up from client system 200 to a remote backup system 290. Remote backup system 290 can comprise, among other things, at least one backup server that is configured to backup one or more content items associated with one or more file systems. The one or more file systems can be associated with one or more managed resources (e.g., client system 200) that are to be backed up based on user preference. Remote backup system 290 can receive one or more content items for backup, for example, files, directories, and/or other items, associated with a file system, and/or metadata associated with the content items, among others. The metadata can include, but not be limited to, names of files/directories, file/directory hierarchy, last modified date, last access date, creation date, user who created file/directory, owner of item, and/or the like.

Detection component 206 can detect a set of content items from among the content items determined by analysis component 204 that match any specified criteria. The specified criteria can include classes of content and contact names associated with the classes of content. In one embodiment, detection component 206 may classify each content item within the set of detected content items into one of multiple classes (or types). Based on the classification, various characteristics of the content item can be determined, including a quality level of the content item, a time frame associated with the content item, a context associated with the content item, and so forth. As examples, the content item can be classified as being a multimedia file such as an image or video file, a message file such as an e-mail or text message, a document file, and so forth. The classification of the content item can also be based on the type of electronic device at which the content item resides or was created. Based on the classification applied on the content item, the detection component 206 can apply specified criteria on the content item to determine whether the content item will be excluded from a backup operation.

Detection component 206 may receive specified criteria (e.g., from a criteria database) including classes of content. In one example, specified criteria may include a multimedia class. Within detection component 206, image translation and/or other object recognition algorithms can be applied to review and analyze the context/content, along with the associated metadata, of the multimedia content items to determine which of the multimedia content items may be excluded from a backup operation. For a multimedia class, the specified criteria may include one or more of the following criteria listed below.

For example, multimedia items (i.e., photos and videos) having a poor quality (e.g., below a resolution quality level) may be excluded. To exclude multimedia content items of poor quality, detection component 206 may interrogate a resolution level embedded in each content item's metadata to determine the items to be excluded. In another example, multimedia content items containing one or more specific objects (e.g., a document, sunset, dog, etc.) may be excluded. Known object detection technologies may be used to determine the content items containing one or more of the specified objects. In yet another example, multimedia content items taken by one or more specified individuals may be excluded. To accomplish this, detection component 206 may analyze the angle (e.g., lower to the ground) of each multimedia content item to determine whether the respective multimedia content item was taken by one of the specified individuals (e.g., a young child). Alternatively or in addition, a multimedia content item's metadata may be interrogated to determine whether a creator of the content item is specified. If a creator is one of the specified individuals, the content item may be excluded. In addition, a user may specify to exclude images embedded in an e-mail message that also reside on an e-mail server.

In another example, specified criteria may include a message class. Within detection component 206, natural language processing and/or other text analysis algorithms can be applied to review and analyze the context/content, along with the associated metadata, of the message content items to determine which of the message content items may be excluded from a backup operation. For a message class, the specified criteria may include one or more of the following: exclude informal conversations, exclude content from one or more specified individuals, exclude conversations that consist of certain contexts (e.g., messages including certain phrases such as "where are you?", "what time will you be there?", "are you coming to our meeting now?", "please bring my black sweater", etc.), exclude conversations with a specific length (e.g., under 15 characters), exclude automatically generated messages (e.g., buffered tweets, location-based text messages), exclude messages generated from one or more specific applications (e.g., from IFTT), and the like.

In yet another example, specified criteria may include a document/file class. Within detection component 206, natural language processing and/or other parsing algorithms can be applied to review and analyze the context/content, along with the associated metadata, of the document/file content items to determine which of the document/file content items may be excluded from a backup operation. For a document/file class, the specified criteria may include one or more of the following: exclude local content that is available on a central server, exclude files with a specified naming convention, exclude documents embedded in an e-mail message that resides on an e-mail server, exclude (or purge) documents generated from a device that no longer exists or owned by a user, and the like.

In yet another example, content items may be excluded based on a creation date of the respective content item. For example, any content items created during a particular time frame (e.g., last 30 days) may be excluded from a backup operation. The metadata of the content item may be interrogated to determine whether the creation date of the content item falls within the time frame for exclusion. In another example, a user may manually select (e.g., "star") each content item residing on client system 200 which to exclude from a backup operation.

As discussed, detection component 206 may detect a set of content items from among the content items determined by analysis component 204 that match any of specified criteria. Responsive to detecting the set of content items that match any of the specified criteria, backup component 208 prevents the set of content items from being backed up to remote backup system 290. The remaining content items to be backed up are then transferred to remote backup system 290 for storage.

Figure 3:
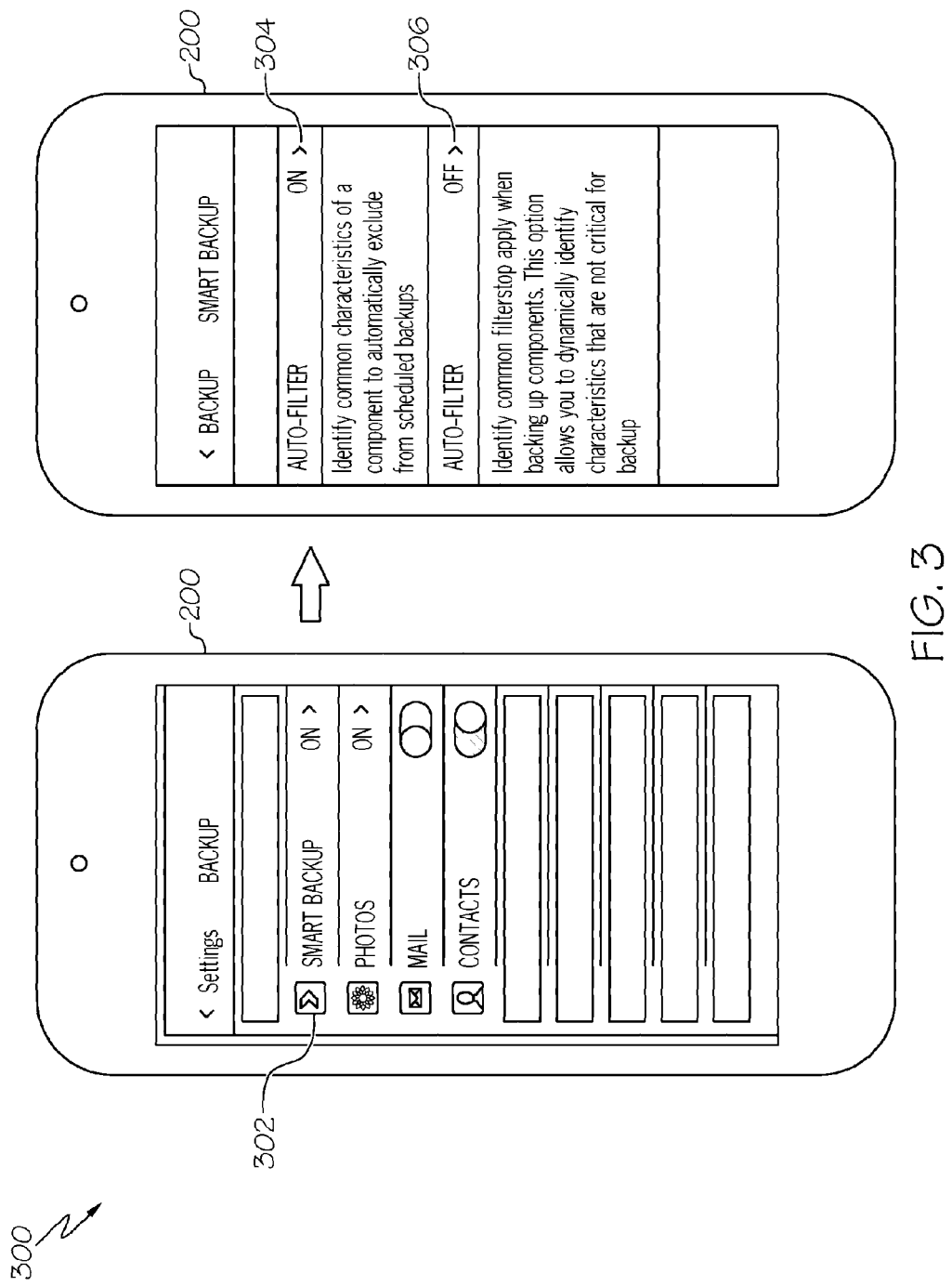
FIG. 3 shows an example scenario 300 in which embodiments of the present invention may operate according to illustrative embodiments.

FIG. 3 shows an example scenario 300 in which embodiments of the present invention may operate. As shown, client system 200 is a smart phone having a touch screen user interface. In this example, embodiments of the present invention may be activated by a user by toggling "Smart-Backup" option 302 to "On". By toggling on the "Smart-Backup" option, a second screen of options may be displayed to the user including "Auto-Filter" 304 and "Custom-Filter" 306. The user can optionally choose to automatically exclude items from a backup solution that share common characteristics identified as non-critical (e.g., image having poor resolution, image having non-critical text such as "Boarding Pass", e-mail messages identified as work-related, etc.) by toggling the "Auto-Filter" option to "On". This "smart backup" criteria may be predefined by a user, a group of users, or other trusted source such as the provider of the backup service. Optionally, the user can view content items to be excluded from a backup operation and remove any content items from the list that the user decides need backed up. In some embodiments, the system can begin to "learn" what characteristics of content items the user deems as non-critical for backup based on content items removed from the exclusion list and adjust the "smart backup" criteria accordingly. For example, if a user has elected to not backup photos having a poor resolution, but routinely removes photos having a poor resolution taken by a particular person from the exclusion list (e.g., a young child), then the "smart backup" criteria can be adjusted to always backup photos taken by that particular person, regardless of photo quality.

Figure 4:
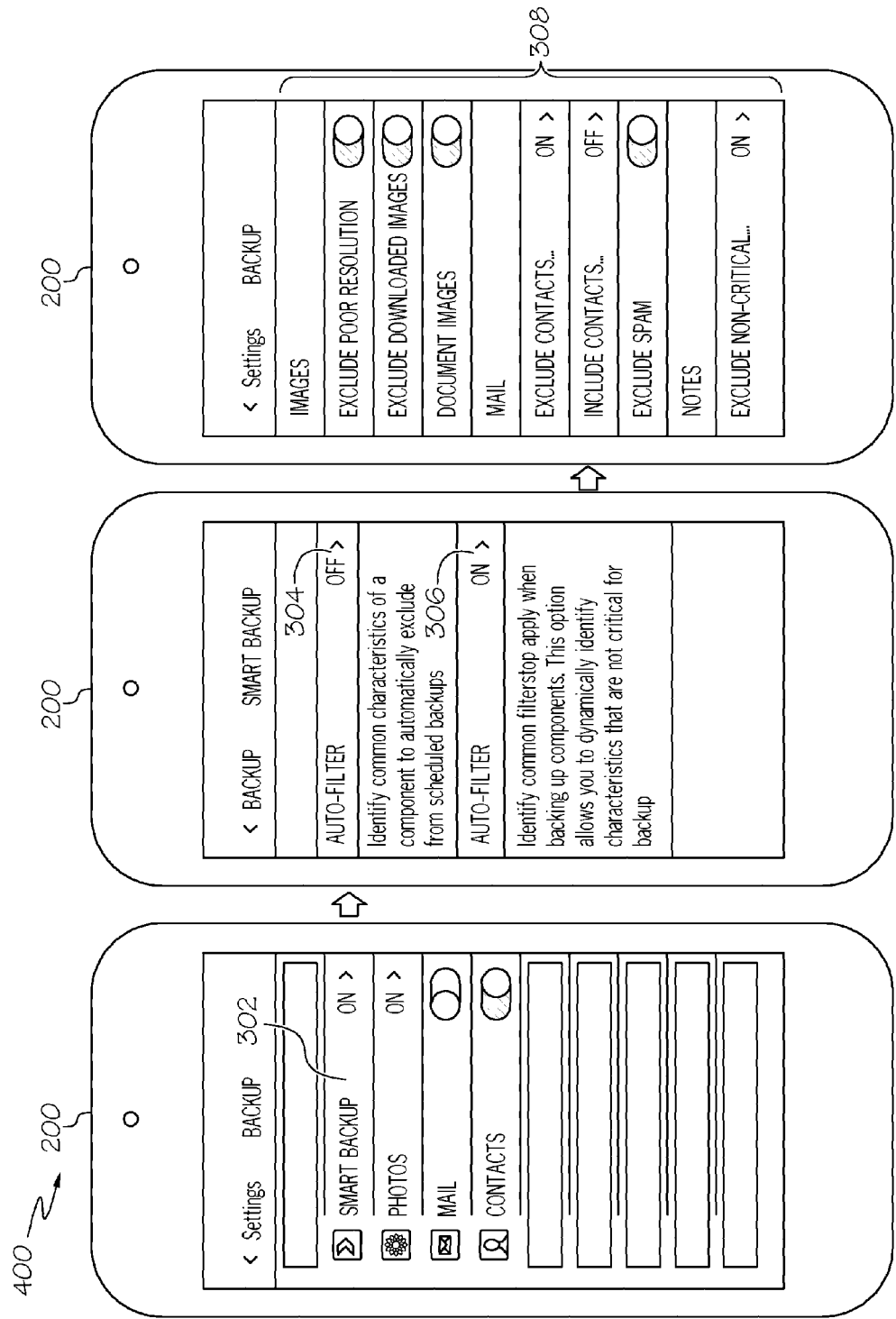
FIG. 4 shows another example scenario 400 in which embodiments of the present invention may operate according to illustrative embodiments.

FIG. 4 shows another example scenario 400 in which embodiments of the present invention may operate. Similar to FIG. 3, client system 200 is a smart phone having a touch screen user interface. In this example, embodiments of the present invention may be activated by a user by toggling "SmartBackup" option 302 and then the "Custom-Filter" option 306 to "On". By doing so, the user is presented with custom filters 308. Each of the custom filters may be toggled on or off based on user preference. The filters may be divided by class (e.g., Images, Mail, Notes, etc.) as shown. The user can optionally specify specific characteristics to explicitly exclude from a backup operation. In this example, the user has chosen to exclude images having a poor resolution, exclude e-mail messages from one or more specified contacts, exclude SPAM e-mail messages, and exclude non-critical Notes. The user may specify the list of contacts for excluding e-mail messages and criteria for determining which Notes are to be considered non-critical via one or more additional screen (not shown).

Figure 5:
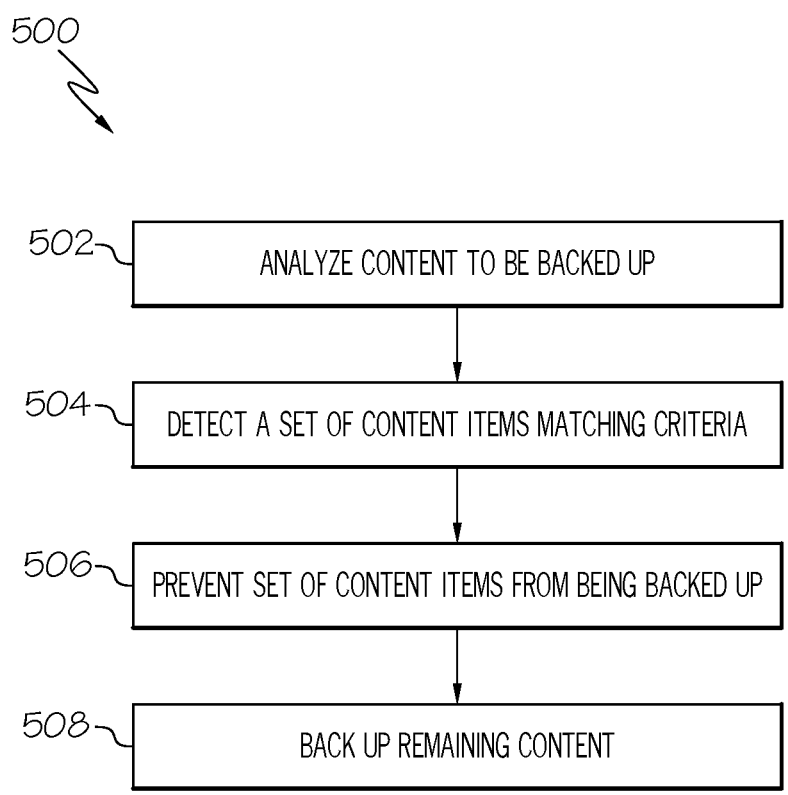
FIG. 5 shows a process flowchart 500 for automatically detecting and preventing backup of content items from a client system to a remote backup system based on specified criteria according to illustrative embodiments.

Referring now to FIG. 5, in conjunction with FIG. 1 and FIG. 2, an implementation of a process 500 for automatically detecting and preventing backup of content items from a client system to a remote backup system based on specified criteria. At step 502, analysis component 204 analyzes content on a client system to determine one or more of content items to be backed up from client system 200 to a remote backup system 290. At step 504, detection component 206 detects a set of content items from among the content items determined by analysis component 204 that match any of specified criteria. The specified criteria may include classes of content (e.g., document, text message, e-mail message, photograph, etc.) and contact names associated with the classes of content (e.g., creator, recipient, sender, owner, etc.). At step 506, responsive to detecting the set of content items that match any of the specified criteria, backup component 208 prevents the set of content items from being backed up to remote backup system 290. At step 508, the remaining content items of the determined one or more content items to be backed up are then transferred to remote backup system 290 for storage.

Process flowchart 500 of FIG. 5 illustrates the architecture, functionality, and operation of possible implementations of systems, methods, and computer program products according to various embodiments of the present invention. In this regard, each block in the flowchart may represent a module, segment, or portion of code, which comprises one or more executable instructions for implementing the specified logical function(s). It should also be noted that, in some alternative implementations, the functions noted in the blocks might occur out of the order depicted in the figures. For example, two blocks shown in succession may, in fact, be executed substantially concurrently. It will also be noted that each block of flowchart illustration can be implemented by special purpose hardware-based systems that perform the specified functions or acts, or combinations of special purpose hardware and computer instructions.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, program/utility 40 may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Any of the components provided herein can be deployed, managed, serviced, etc., by a service provider that offers to deploy or integrate computing infrastructure with respect to a process for automatically detecting and preventing backup of content items from a client system to a remote backup system based on specified criteria. Thus, embodiments herein disclose a process for supporting computer infrastructure, comprising integrating, hosting, maintaining, and deploying computer-readable code into a computing system (e.g., computer system 12), wherein the code in combination with the computing system is capable of performing the functions described herein.

In another embodiment, the invention provides a method that performs the process steps of the invention on a subscription, advertising, and/or fee basis. That is, a service provider, such as a Solution Integrator, can offer to create, maintain, support, etc., a process for automatically detecting and preventing backup of content items from a client system to a remote backup system based on specified criteria. In this case, the service provider can create, maintain, support, etc., a computer infrastructure that performs the process steps of the invention for one or more customers. In return, the service provider can receive payment from the customer(s) under a subscription and/or fee agreement, and/or the service provider can receive payment from the sale of advertising content to one or more third parties.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may also be a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

It is apparent that there has been provided herein approaches to automatically detect and prevent backup of content items from a client system to a remote backup system based on specified criteria. While the invention has been particularly shown and described in conjunction with exemplary embodiments, it will be appreciated that variations and modifications will occur to those skilled in the art. Therefore, it is to be understood that the appended claims are intended to cover all such modifications and changes that fall within the true spirit of the invention.

What is claimed is:

1. A computer-implemented method for automatically detecting and preventing backup of content items from a client system to a remote backup system, comprising:
   analyzing content on the client system to determine one or more content items to be backed up from the client system to the remote backup system;
   detecting a set of content items among the one or more content items that match one or more specified criteria, wherein the one or more specified criteria include at least one of: classes of content, one or more contact names associated with the classes of content, a quality of a content item, a subject of a content item, or a location of a content item;
   responsive to detecting the set of content items that match the one or more specified criteria, preventing a content item of the set of content items from being backed up to the remote backup system; and
   transferring any remaining content items to be backed up to the remote backup system for storage.

2. The method of claim 1, wherein the one or more specified criteria further includes one or more specified classifications for document files indicating that the documents are to be prevented from being backed to the remote backup system.

3. The method of claim 2, wherein the one or more specified classifications includes at least one of: the document file is available on a central server, the document file contains text below a predefined number of characters, the document file was created within a predefined time frame, the document file was generated from a predefined application, or the document file was automatically generated.

4. The method of claim 1, further comprising displaying the set of content items that match the one or more specified criteria to a user prior to preventing the set of content items from being backed up to the remote backup system.

5. The method of claim 4, further comprising removing one or more content items from the set of content items that match the one or more specified criteria based on user input to allow the one or more content times to be backed up.

6. The method of claim 5, further comprising updating the one or more specified criteria upon removing one or more content items from the set of content items that match the one or more specified criteria.

7. The method of claim 1, wherein the one or more classes of content include at least one of: a multimedia class, an image class, a video class, a messaging class, an e-mail message class, a text message class, a document class, a file class, or a notes class, wherein the one or more contact names associated with the classes of content include at least one of: a content item owner, a content item sender, a content item recipient, or a content owner creator.

8. A computer system for automatically detecting and preventing backup of content items from a client system to a remote backup system, the computer system comprising:
   a memory medium comprising program instructions;
   a bus coupled to the memory medium; and
   a processor for executing the program instructions, the instructions causing the system to:
   analyze content on the client system to determine one or more content items to be backed up from the client system to the remote backup system;
   detect a set of content items among the one or more content items that match one or more specified criteria, wherein the one or more specified criteria include at least one of: classes of content, one or more contact names associated with the classes of content, a quality of a content item, a subject of a content item, or a location of a content item;
   responsive to detecting the set of content items that match the one or more specified criteria, prevent the set of content items from being backed up to the remote backup system; and
   transfer any remaining content items to be backed up to the remote backup system for storage.

9. The computer system of claim 8, wherein the one or more specified criteria further includes one or more specified classifications for document files indicating that the documents are to be prevented from being backed to the remote backup system.

10. The computer system of claim 9, wherein the one or more specified classifications includes at least one of: the document file is available on a central server, the document file contains text below a predefined number of characters, the document file was created within a predefined time frame, the document file was generated from a predefined application, or the document file was automatically generated.

11. The computer system of claim 8, further comprising program instructions to display the set of content items that match the one or more specified criteria to a user prior to preventing the set of content items from being backed up to the remote backup system.

12. The computer system of claim 11, further comprising program instructions to remove one or more content items from the set of content items that match the one or more specified criteria based on user input to allow the one or more content times to be backed up.

13. The computer system of claim 12, further comprising program instructions to update the one or more specified criteria upon removing one or more content items from the set of content items that match the one or more specified criteria.

14. The computer system of claim 8, wherein the one or more classes of content include at least one of: a multimedia class, an image class, a video class, a messaging class, an e-mail message class, a text message class, a document class, a file class, or a notes class, wherein the one or more contact names associated with the classes of content include at least one of: a content item owner, a content item sender, a content item recipient, or a content owner creator.

15. A computer program product for automatically detecting and preventing backup of content items from a client system to a remote backup system, the computer program product comprising a computer readable storage device, and program instructions stored on the computer readable storage device, to:
   analyze content on the client system to determine one or more content items to be backed up from the client system to the remote backup system;
   detecting a set of content items among the one or more content items that match one or more specified criteria, wherein the one or more specified criteria include at least one of: classes of content, one or more contact names associated with the classes of content, a quality of a content item, a subject of a content item, or a location of a content item;

responsive to detecting the set of content items that match the one or more specified criteria, prevent the set of content items from being backed up to the remote backup system; and transfer any remaining content items to be backed up to the remote backup system for storage.

16. The computer program product of claim 15, wherein the one or more specified criteria further includes one or more specified classifications for document files indicating that the documents are to be prevented from being backed to the remote backup system.

17. The computer program product of claim 16, wherein the one or more specified classifications includes at least one of: the document file is available on a central server, the document file contains text below a predefined number of characters, the document file was created within a predefined time frame, the document file was generated from a predefined application, or the document file was automatically generated.

18. The computer program product of claim 15, further comprising program instructions to display the set of content items that match the one or more specified criteria to a user prior to preventing the set of content items from being backed up to the remote backup system.

19. The computer program product of claim 18, further comprising program instructions to remove one or more content items from the set of content items that match the one or more specified criteria based on user input to allow the one or more content times to be backed up.

20. The computer program product of claim 19, further comprising program instructions to update the one or more specified criteria upon removing one or more content items from the set of content items that match the one or more specified criteria.

\* \* \* \* \*